US009117467B1

(12) United States Patent
Teng et al.

(10) Patent No.: US 9,117,467 B1
(45) Date of Patent: Aug. 25, 2015

(54) DISK DRIVE HEAD SUSPENSION INCLUDING A GROUNDED CONDUCTIVE SUBSTRATE

(71) Applicant: SAE Magnetics (H.K.) Ltd., Hong Kong (CN)

(72) Inventors: ZhaoYu Teng, GuangDong (CN); ChongXi Song, GuangDong (CN); YongWen Yang, GuangDong (CN); Tan Tian, GuangDong (CN); XianWen Feng, GuangDong (CN); MingBing Huang, GuangDong (CN)

(73) Assignee: SAE MAGNETICS (H.K.) LTD., Hong Kong (CN)

( * ) Notice: Subject to any disclaimer, the term of this patent is extended or adjusted under 35 U.S.C. 154(b) by 0 days.

(21) Appl. No.: 14/475,962

(22) Filed: Sep. 3, 2014

(30) Foreign Application Priority Data

Aug. 19, 2014 (CN) .......................... 2014 1 0408562

(51) Int. Cl.
*G11B 5/48* (2006.01)

(52) U.S. Cl.
CPC ............ *G11B 5/4833* (2013.01); *G11B 5/4853* (2013.01)

(58) Field of Classification Search
CPC ... G11B 5/4826; G11B 5/4833; G11B 5/4853
USPC ............. 360/245.8, 245.9, 246, 264.2, 234.5, 360/245.3
See application file for complete search history.

(56) References Cited

U.S. PATENT DOCUMENTS

| | | | |
|---|---|---|---|
| 6,518,521 B1 * | 2/2003 | Marek et al. | 200/16 D |
| 6,801,402 B1 | 10/2004 | Subrahmanyam et al. | |
| 6,872,896 B1 * | 3/2005 | Young et al. | 200/16 A |
| 6,956,722 B2 * | 10/2005 | Wada et al. | 360/245.8 |
| 7,382,582 B1 * | 6/2008 | Cuevas | 360/245.9 |
| 7,538,986 B2 * | 5/2009 | Iben | 360/323 |
| 7,692,899 B2 | 4/2010 | Arai et al. | |
| 8,169,746 B1 * | 5/2012 | Rice et al. | 360/245.9 |
| 8,218,267 B2 | 7/2012 | Arai et al. | |
| 8,395,866 B1 * | 3/2013 | Schreiber et al. | 360/245.9 |
| 2002/0154454 A1 | 10/2002 | Kupinski et al. | |
| 2003/0174445 A1 * | 9/2003 | Luo | 360/245.9 |
| 2005/0061542 A1 * | 3/2005 | Aonuma et al. | 174/255 |
| 2006/0187587 A1 | 8/2006 | Arai et al. | |
| 2007/0253176 A1 * | 11/2007 | Ishii et al. | 361/760 |

* cited by examiner

*Primary Examiner* — Jefferson Evans
(74) *Attorney, Agent, or Firm* — Nixon & Vanderhye PC (57) ABSTRACT

A suspension includes a flexure including a conductive substrate, and a dielectric layer formed on the conductive substrate, and the conductive substrate being grounded; and a plurality of electrical traces formed on the dielectric layer and extending from a leading portion to a trailing portion of the flexure, and the electrical traces at least having a pair of read traces. At least one via is formed at certain position on the read traces to connect the read traces with the conductive substrate that is etched partially. It can minimize ESD damage during various stages of manufacturing process of the disk drive unit, reduce manufacturing cost, and also improve electrical performance of the suspension interconnection.

9 Claims, 14 Drawing Sheets

DISK DRIVE HEAD SUSPENSION INCLUDING A GROUNDED CONDUCTIVE SUBSTRATE

This application claims priority to Chinese Application No. 201410408562.X filed Aug. 19, 2014, the entire contents of which is hereby incorporated by reference.

FIELD OF THE INVENTION

The present invention relates to information recording disk drive devices and, more particularly to a suspension with electrostatic discharge (ESD) protection structure, head gimbal assembly (HGA) and disk drive unit with the same.

BACKGROUND OF THE INVENTION

Figure 1A:
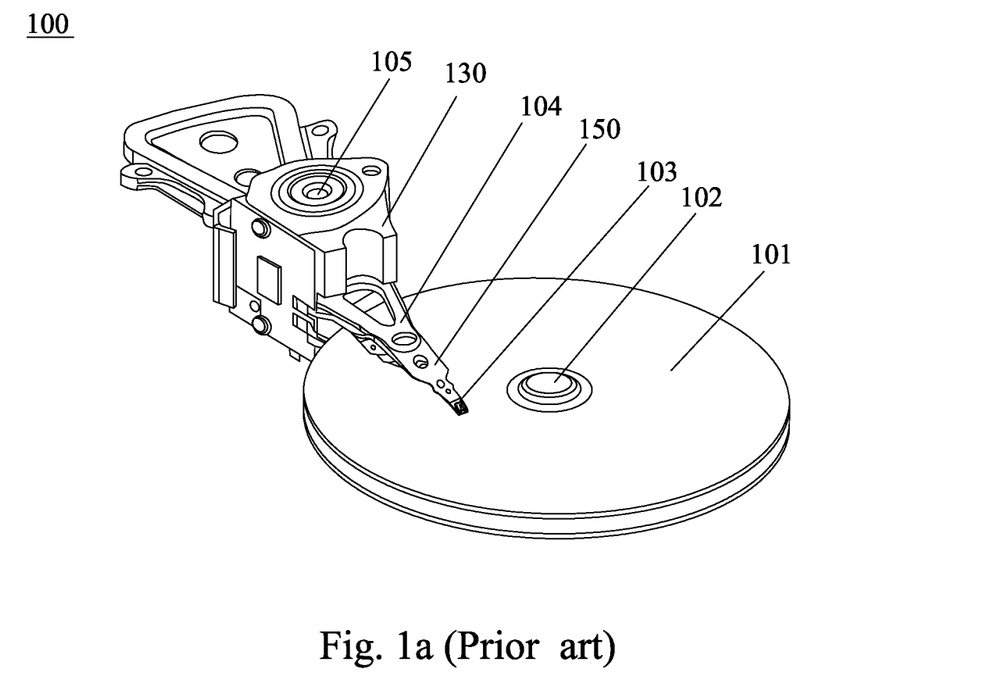
FIG. 1a is a perspective view of a conventional disk drive unit.

Hard disk drives are common information storage devices. FIG. 1a provides an illustration of a typical disk drive unit 100 essentially consisting of a series of rotatable disks 101 mounted on a spindle motor 102, and a Head Stack Assembly (HSA) 130 which is rotatable about an actuator arm axis 105 for accessing data tracks on disks during seeking. The HSA 130 includes at least one drive arm 104 and HGA 150. Typically, a spindling voice-coil motor (VCM) is provided for controlling the motion of the drive arm 104.

Figure 1B:
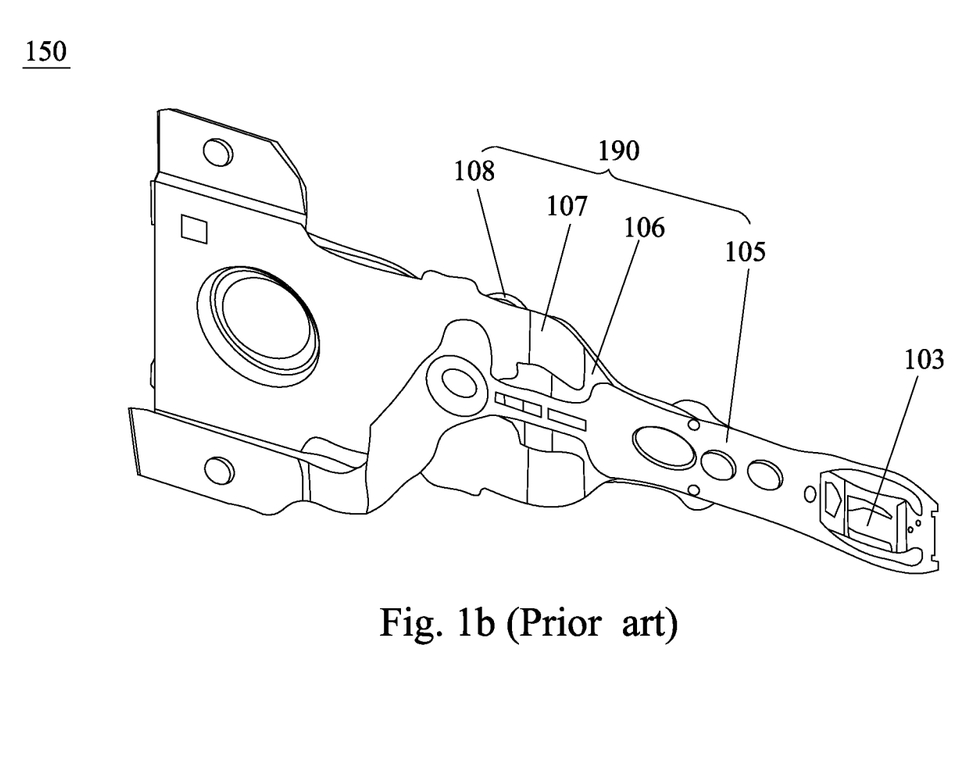
FIG. 1b is a perspective view of a conventional HGA.

Referring to FIG. 1b, the HGA 150 includes a slider 103 having a reading/writing transducer (not shown) imbedded therein, a suspension 190 to load or suspend the slider 103 thereon. When the disk drive is on, a spindle motor 102 will rotate the disk 101 at a high speed, and the slider 103 will fly above the disk 101 due to the air pressure drawn by the rotated disk 101. The slider 103 moves across the surface of the disk 101 in the radius direction under the control of the VCM. With a different track, the slider 103 can read data from or write data to the disk 101.

Figure 1C:
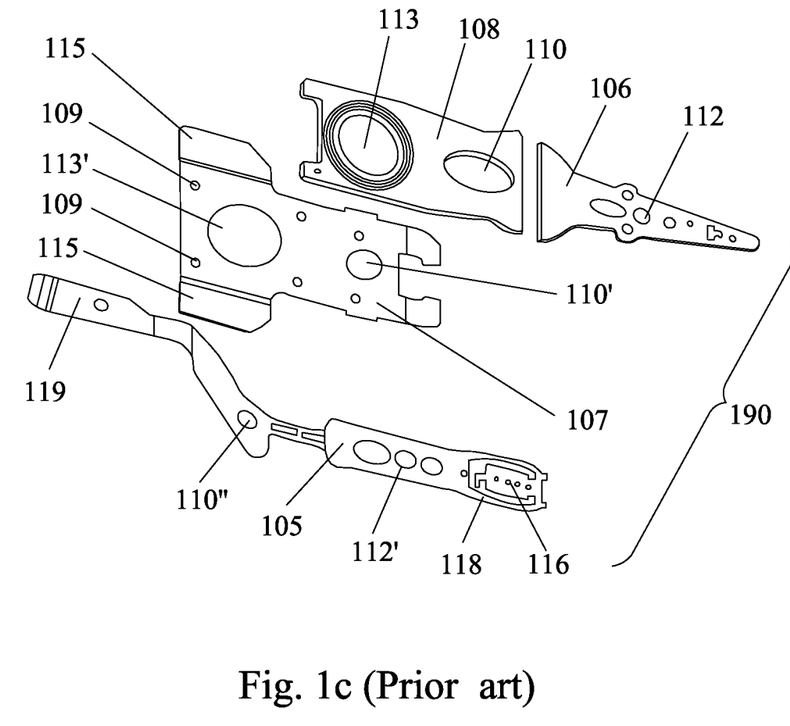
FIG. 1c is an exploded perspective view of the HGA shown in FIG. 1b.

FIG. 1c shows a conventional suspension, the suspension 190 includes a load beam 106, a base plate 108, a hinge 107 and a flexure 105, all of which are assembled together.

The load beam 106 is connected to the base plate 108 by the hinge 107. A locating hole 112 is formed on the load beam 106 for aligning the load beam 106 with the flexure 105. And the load beam 106 is welded with the flexure for increasing the strength of the entire structure.

The base plate 108 is used to enhance structure stiffness of the whole HGA 150. A mounting hole 113 is formed on one end of the base plate 108 for mounting the whole HGA 150 to the motor arm 104 (referring to FIG. 1a). Another hole 110 is formed on the other end of the base plate 108, which is aligned with a hole 110' formed on the hinge 107 and a hole 110" formed on the flexure 105. The hinge 107 has a mounting hole 113' formed on its one end corresponding to the mounting hole 113 of the base plate 108, and the hinge 107 is partially mounted to the base plate 108 with the mounting holes 113', 113 aligned with each other. The hinge 107 and the base plate 108 may be mounted together by laser welding at pinpoints 109 distributed on the hinge 107. Two hinge steps 115 are integrally formed at two sides of the hinge 107 at one end adjacent the mounting hole 113' for connecting with the flexure 105.

The flexure 105 runs from the hinge 107 to the load beam 106. The flexure 105 has a proximal end 119 adjacent the hinge 107 and a distal end 118 adjacent the load beam 106. A locating hole 112' is formed on the distal end 118 of the flexure 105 and aligned with the locating hole 112 of the load beam 106, thus obtaining a high assembly precision. A suspension tongue 116 is provided at the distal end of the flexure 105 to carry the slider 103 thereon.

Figure 1D:
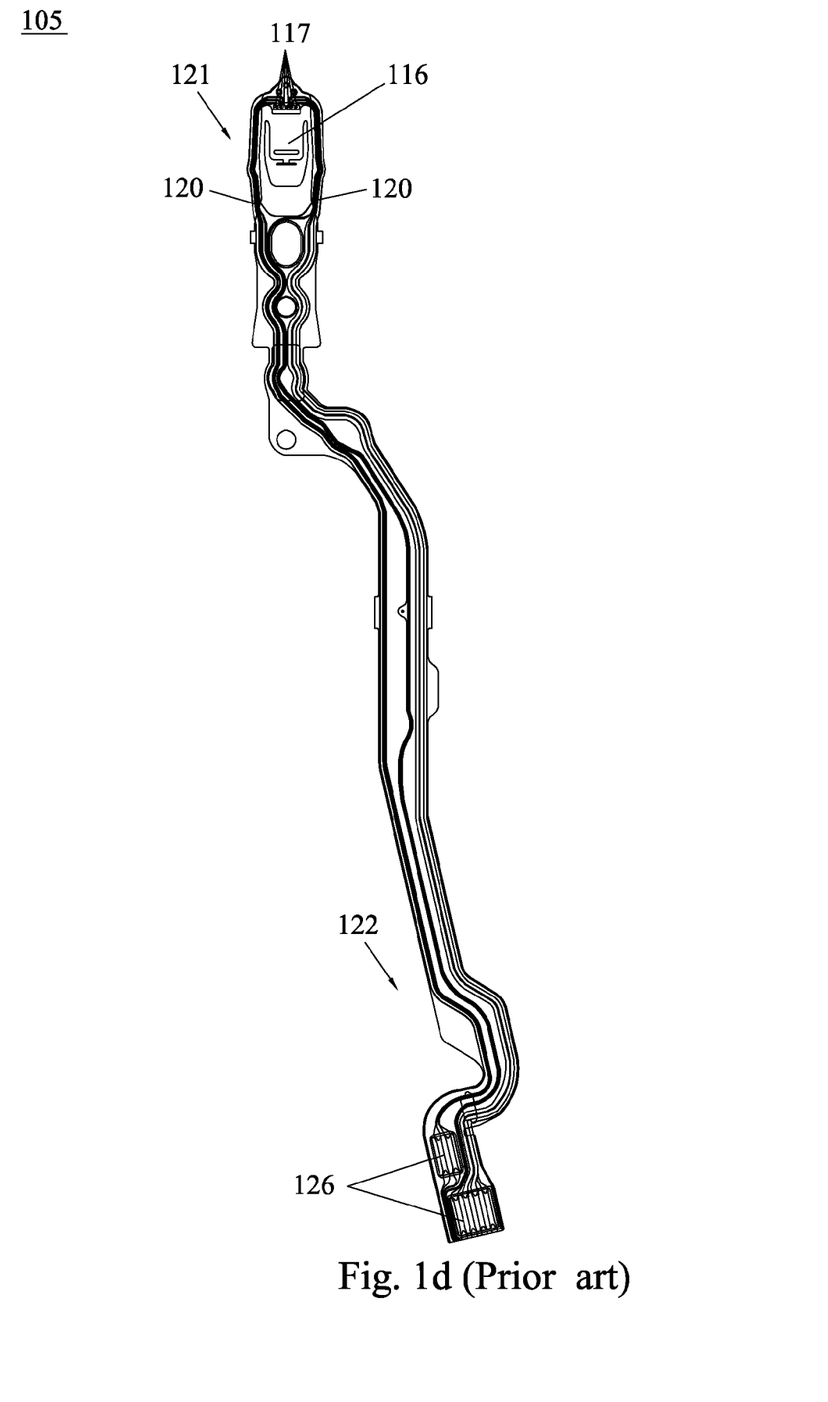
FIG. 1d is a top view of a flexure of the suspension shown in FIG. 1c.

As illustrated in FIG. 1d, the flexure 105 has a leading portion 121 adjacent the suspension tongue 116, and a trailing portion 122 opposite to the leading portion 121. A plurality of electrical traces 120 is formed on the flexure 105 along length direction thereof. More specifically, the electrical traces 120 begin with the leading portion 121 and terminate at the trailing portion 122. The suspension tongue 116 has a plurality of bonding pads 117 formed thereon for coupling the slider 103. One end of the electrical traces 120 connects to the bonding pads 117, and the other end thereof is electrically connected to a signal processing circuit, such as an integrated circuit (not shown). Generally, the electrical traces 120 extending from the bonding pads 117 includes three pairs which respectively are a pair of read traces, a pair of write traces and heat traces. All of traces will be jointed to several terminal pads 126 at the trailing portion 122.

As always, electrostatic discharge (ESD) may be generated any time during the fabrication, assembly, testing and shipment of the disk drive units. Specifically, ESD may be generated during fabrication of the magnetoresistive head, the head gimbal assembly, the E-block assembly, the final disk drive units, electrical testing of component and shipment of the components. In response, various procedures and equipment have been installed to control ESD levels during every stage of handling through final disk drive assembly to prevent damage to the reader element caused by ESD, especially during the head gimbal assembly. That is because the magnetoresistive heads nowadays have much smaller size, which results the reduced ESD threshold, and there is no any integrated circuit (IC) for ESD protection in head gimbal assembly.

Traditional ESD protection structure always needs additional material, for example, using surface mount technology (SMT) bleed resistors between the traces and ground to release the static charge on the traces; or forming an ESD dissipative polyimide (PI) layer between trace and conductive substrate to release the static charge on the traces; or covering a dissipative/conductive polymer layer on the outer surface of the flexure to achieve low charge voltage on the read traces and protect from ESD damage. However, these solutions are complex and need much additional material which leads to a high manufacturing cost.

Thus, there is a need for an improved suspension with ESD protection structure, HGA and disk drive unit that do not suffer from the above-mentioned drawbacks.

References cited:
U.S. 2002/0154454 A1, Oct. 24, 2002, Kupinski et al.;
U.S. 2006/0187587A1, Aug. 24, 2006, Arai et al.;
U.S. Pat. No. 6,801,402 B1, Oct. 5, 2004, Subrahmanyam et al.;
U.S. Pat. No. 7,692,899 B2, Apr. 6, 2010, Arai et al.;
U.S. Pat. No. 8,218,267 B2, Jul. 10, 2012, Arai et al..

SUMMARY OF THE INVENTION

One aspect of the present invention is to provide a suspension with an ESD protection structure, which minimizes ESD damage during various stages of manufacturing process of the disk drive unit, reduces manufacturing cost, and also improves electrical performance of the suspension interconnection.

Another aspect of the present invention is to provide a head gimbal assembly (HGA) having a suspension with an ESD protection structure, which minimizes ESD damage during various stages of manufacturing process of the disk drive unit, reduces manufacturing cost, and also improves electrical performance of the suspension interconnection.

Yet another aspect of the present invention is to provide a disk drive unit having a suspension with an ESD protection structure, which minimizes ESD damage during various stages of manufacturing process of the disk drive unit, reduces manufacturing cost, and also improves electrical performance of the suspension interconnection.

To achieve above objectives, a suspension for a HGA of the present invention includes a flexure comprising a conductive substrate, and a dielectric layer formed on the conductive substrate, and the conductive substrate being grounded; and a plurality of electrical traces formed on the dielectric layer and extending from a leading portion to a trailing portion of the flexure, and the electrical traces at least comprising a pair of read traces. At least one via is formed at certain position on the read traces to connect the read traces with the conductive substrate that is etched partially.

As an embodiment of the present invention, the conductive substrate includes a substrate main body, at least one substrate section, and at least one slot formed between the substrate main body and the substrate section, and the substrate section is located beneath the via, and electrically connected with the read traces by conductive material in via.

Preferably, the substrate section is formed by etching the conductive substrate, until a dissipative film with predetermined resistance value that is remained in the slot after etching, to electrically connect the substrate section to the substrate main body within the predetermined resistance value.

Preferably, the predetermined resistance value of the dissipative film is in a range from 1.0E+4 to 1.0E+11 ohms.

Preferably, the flexure further includes an insulating cover layer that is covered on the electrical traces.

A HGA of the present invention includes a slider, and a suspension for supporting the slider. The suspension includes a flexure comprising a conductive substrate, and a dielectric layer formed on the conductive substrate, and the conductive substrate being grounded; and a plurality of electrical traces formed on the dielectric layer and extending from a leading portion to a trailing portion of the flexure, and the electrical traces at least comprising a pair of read traces. At least one via is formed at certain position on the read traces to connect the read traces with the conductive substrate that is etched partially.

As an embodiment of the present invention, the conductive substrate includes a substrate main body, at least one substrate section, and at least one slot formed between the substrate main body and the substrate section, and the substrate section is located beneath the via, and electrically connected with the read traces by conductive material in the via.

Preferably, the substrate section is formed by etching the conductive substrate, until a dissipative film with predetermined resistance value that is remained in the slot after etching, to electrically connect the substrate section to the substrate main body.

Preferably, the predetermined resistance value of the dissipative film is in a range from 1.0E+4 to 1.0E+11 ohms.

Preferably, the flexure further includes an insulating cover layer that is covered on the electrical traces.

A disk drive unit of the present invention includes a HGA including a slider and a suspension that supports the slider, a drive arm connected to the head gimbal assembly, a series of disks, and a spindle motor operable to spin the disks. The suspension includes a flexure having a conductive substrate, and a dielectric layer formed on the conductive substrate, and the conductive substrate being grounded; and a plurality of electrical traces formed on the dielectric layer and extending from a leading portion to a trailing portion of the flexure, and the electrical traces at least comprising a pair of read traces. At least one via is formed at certain position on the read traces to connect the read traces with the conductive substrate that is etched partially.

Compared with the prior art, since a via is formed on the read traces to connect with the conductive substrate, thereby an ESD bleed path from the read traces to the conductive substrate that is grounded is formed, thus ESD damage to the read element is minimized or even eliminated. Furthermore, because the conductive substrate is etched partially, thus the connection resistance from the read traces to the conductive substrate is increased accordingly, which is suitable for releasing the static charge on the read traces and ensuring normal operation of read signal. Further, as this invention includes via from the read traces to the conductive substrate (stainless steel), different from prior art, trace stub at the end of the suspension tail is no longer needed in electroplating process, then electrical performance (like bandwidth and impedance continuity) can be improved due to the removal of stub. Therefore in this present invention, the structure for ESD protection system is simple to reduce manufacturing cost, and electrical performance of the suspension interconnection is improved as well.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Various preferred embodiments of the invention will now be described with reference to the figures, wherein like reference numerals designate similar parts throughout the various views. As indicated above, the invention is directed to a suspension for a HGA of a disk drive unit, which has an ESD protection structure, so as to minimize ESD damage during various stages of manufacturing process of the disk drive unit, reduce manufacturing cost, and also improve electrical performance of the suspension interconnection.

Figure 2:
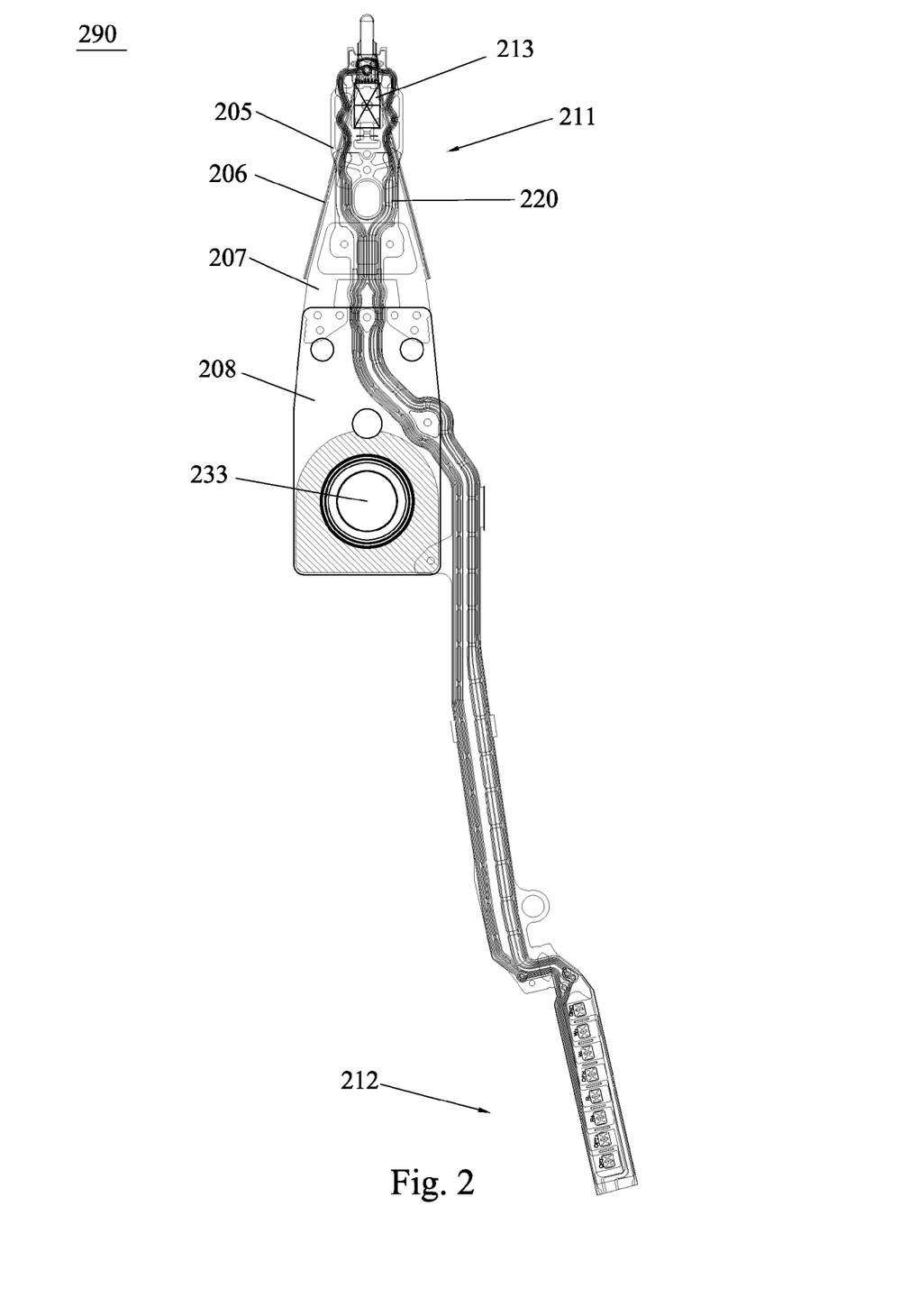
FIG. 2 is a top view of a suspension according to an embodiment of the present invention.

FIG. 2 shows an embodiment of a suspension of the present invention. As illustrated in FIG. 2, a suspension 290 including a load beam 206, a base plate 208, a hinge 207 and a flexure 205, all of which are assembled with each other.

Referring to FIG. 2, the load beam 206 is used to transfer load forces to the flexure 205 and a slider (not shown) mounted on the flexure 205. Any suitable rigid material such as stainless steel may be used to form the load beam 206 such that the load beam 206 has sufficient stiffness to transfer the load forces to the flexure 205. The load beam 206 is connected to the base plate 208 by the hinge 207. The base plate 208 is used to enhance structure stiffness of the whole suspension 290 and may be made of rigid material such as stainless steel. A mounting hole 233 is formed on one end of the base plate 208 for mounting the whole suspension 290 to a motor arm of a disk drive unit. The hinge 207 has a mounting hole formed on its one end corresponding to the mounting hole 233 of the base plate 208, and the hinge 207 is partially mounted to the base plate 208. The hinge 207 and the base plate 208 may be mounted together by laser welding at a plurality of pinpoints distributed on the hinge 207.

As shown in FIG. 2, the flexure 205 has a leading portion 211 and a trailing portion (distal end) 212 opposite to the leading portion 211. A suspension tongue 213 is provided at the leading portion 211 of the flexure 205 to support a slider 203 (referring to FIG. 10) thereon. A plurality of electrical traces 220 is formed on the flexure 205 along length direction thereof. More specifically, the electrical traces 220 extend from the leading portion 211 to the trailing portion 212. More concretely, the electrical traces 220 have several pads (not indicated) positioned at the leading portion 211 of the flexure 205, so as to couple the slider 203 at the suspension tongue 213. Similarly, the electrical traces 220 also have several pads (not indicated) positioned at the trailing portion 212 of the flexure 205, so as to connect with a flexure printed cable (not shown).

Figure 3:
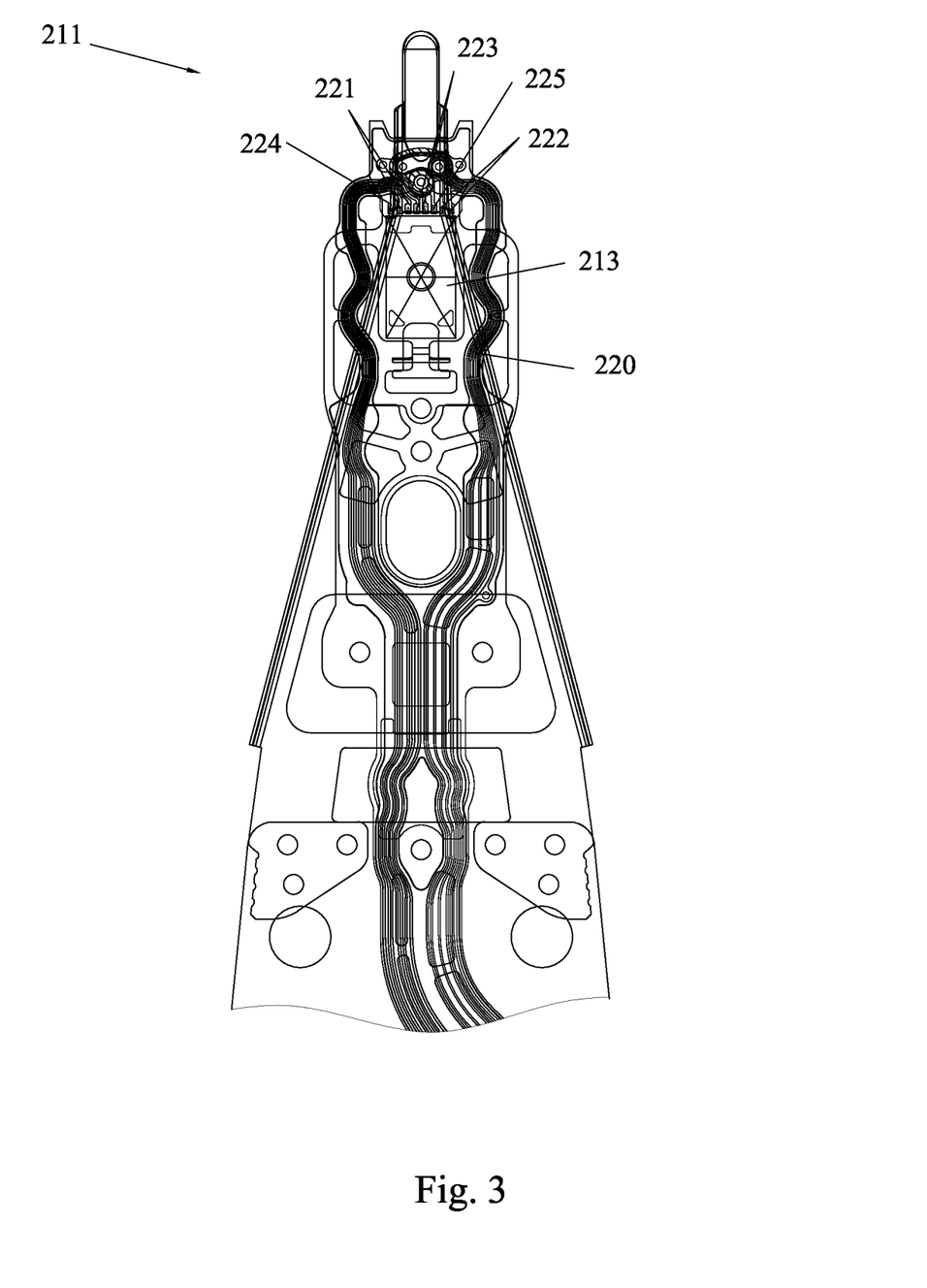
FIG. 3 is a detailed structure view of a leading portion of the flexure shown in FIG. 2.
Figure 5:
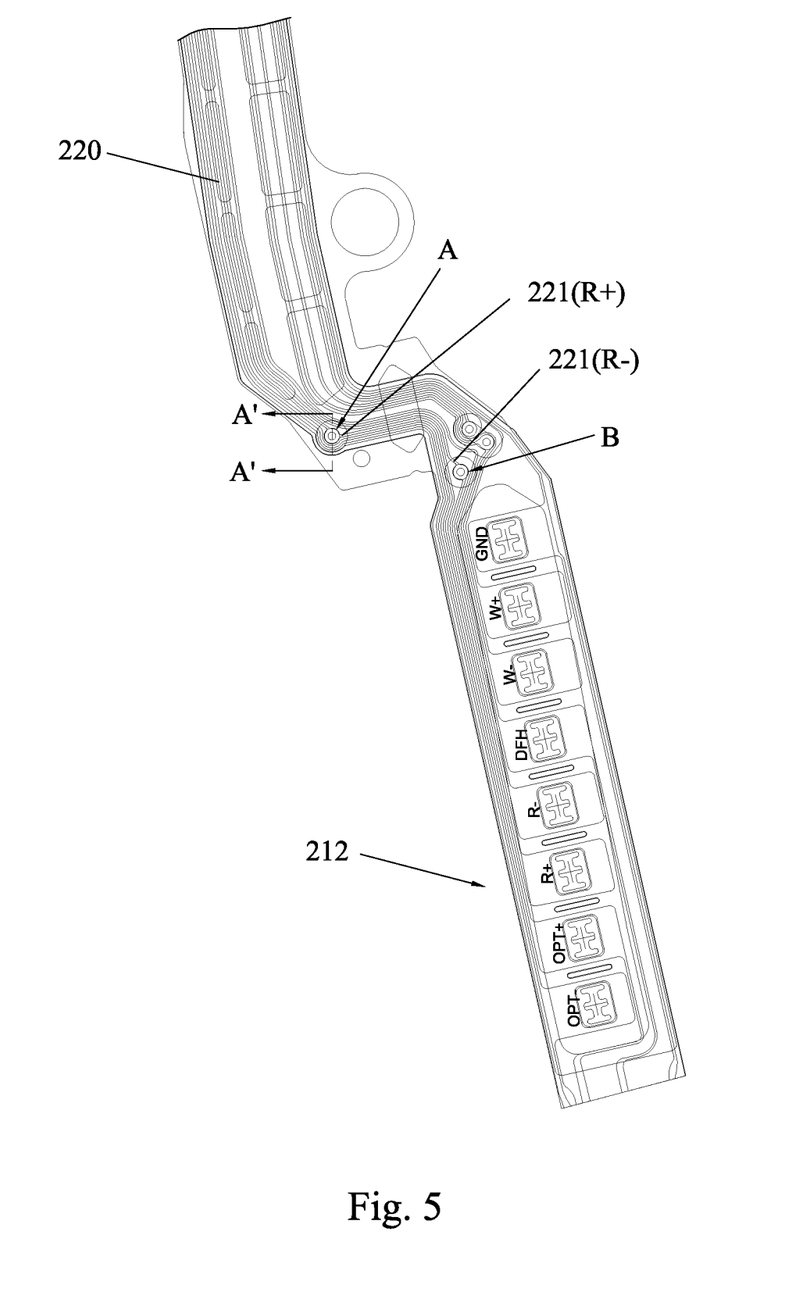
FIG. 5 is a detailed structure view of a trailing portion of the flexure shown in FIG. 2.

FIG. 3 shows a detailed structure view of the leading portion 211 of the flexure 205. The electrical traces 220 respectively include a pair of read traces 221, a pair of write traces 222, a pair of fly height sense traces 223, preferably and a head heater trace 224 and a ground trace 225. Each trace includes a bonding pad positioned on the leading portion 211 and a terminal pad positioned on the trailing portion 212 (as shown in FIG. 5), and its main body trace extended along the flexure 205. As the detailed function and the structure of the traces are well known to persons skilled in the art, thus their corresponding descriptions are omitted here. Specifically, an ESD protection structure on the read traces 221 will be described in detailed, as following.

Figure 4:
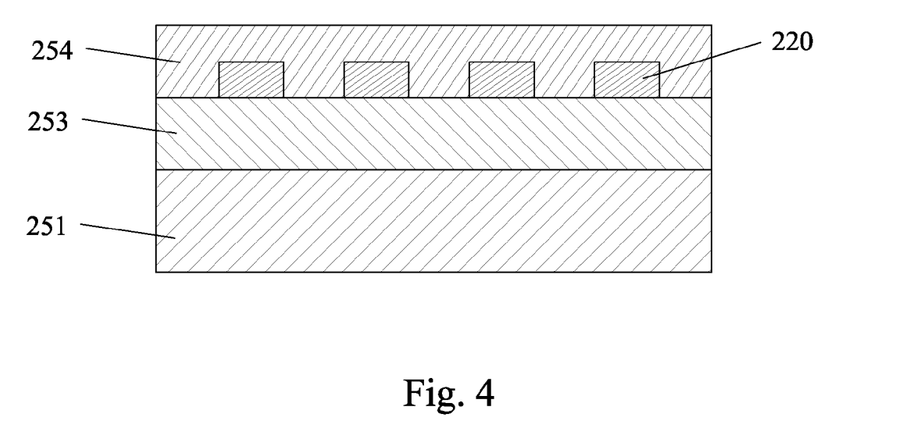
FIG. 4 shows a cross-section of the flexure and the electrical traces.

As shown in FIG. 4, the flexure 205 is a laminated structure at includes a substrate 251 that is made of a low conductivity thin plate, for example, a resilient thin stainless steel (SST) plate. On the substrate 251, a dielectric layer 253 made of flexible dielectric resin such as polyimide and having a thickness of about 5 μm to 20 μm is formed. On the dielectric layer 253, the electrical traces 220 are formed, in this figure, only four traces (two pairs) are showed for illustration, actual trace number on suspension can be more than four. Preferably, an insulating cover layer 254 is formed and covered the surfaces of the traces 220 to protect them from external force and the like.

In this embodiment, an ESD protection structure is configured to the read traces 221, as shown in FIG. 5, this ESD protection structure has two conductive via A and B formed on the read traces 221 to electrically connect with the substrate 251, so as to form an ESD bleed path. Specifically, such an ESD bleed path a may be configured in any position of the read traces 221, and the number of the path may be one or more. In this embodiment, two conductive via A and B are configured on positive read trace 221 (R+) and negative read trace 221 (R−) respectively, at a position that is closed to the distal end of the flexure 205, preferably.

Figure 6:
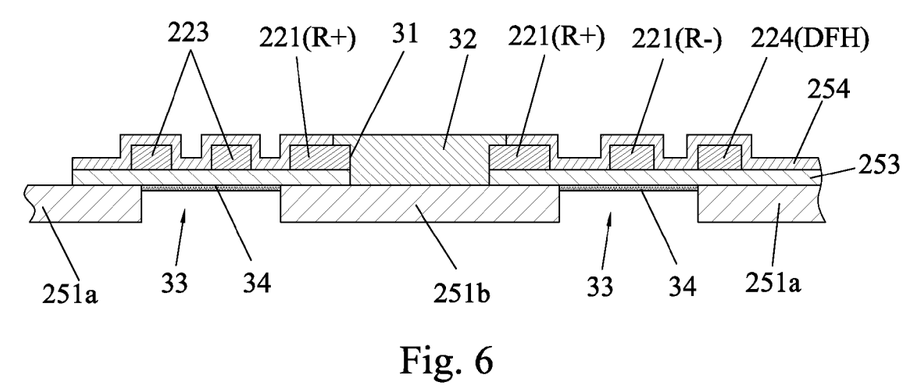
FIG. 6 is a cross-section of the conductive via along A'-A' line shown in FIG. 5.

Now one of the ESD bleed path with the conductive via is described, as connected with the positive read trace 221 (R+). FIG. 6 shows a cross section view of the conductive via A along A'-A' line. As shown, a via hole 31 is formed through the read trace 221 and the dielectric layer 253, from top to bottom, preferably, the via hole 31 is formed through the insulating cover layer 254 also. In this condition, side walls of the read trace 221 and the dielectric layer 253, and a top surface of a part of the substrate 251 are exposed in the via hole 31. And the via hole 31 is filled with conductive material 32, in order to electrically connect the read trace 221 with the conductive substrate 251. In such a way, a conductive path consisted of read trace 221, conductive material 32, and substrate 251 that is grounded is made.

For enhancing the ESD protection and preventing read signal short to ground, as shown in FIG. 6 again, the substrate 251 includes a substrate main body 251a and a substrate section 251b, and a slot 33 is formed between the substrate main body 251a and the substrate section 251b. Concretely, the substrate section 251b is located beneath the via hole 31 and electrically connected with the conductive material 32. Specifically, the slot 33 is formed by an etching process, firstly, a proper resist pattern with partial exposure is covered on the substrate 251, and then the substrate 251 is etched by etching method with corrosive liquid, such as an aqueous solution of ferric chloride or the like, so that the slot 33 is formed. With the contemplation of the present invention, the substrate part in the slot 33 is not etched completely, instead, a dissipative film 34 is remained in the slot 33, and such a dissipative film 34 is extremely thin, thereby it seems that the substrate section 251b is separated from the substrate main body 251a, like an island. Specifically, this dissipative film 34 is formed by controlling the etching time and etching rate, until its connection resistance with the substrate main body 251a and the substrate section 251b of the substrate 251 is controlled in the range from 1.0E+4 to 1.0E+11 ohms. With this resistance, the dissipative film 34 is sufficiently insulative in terms of a normal circuit operation, but adequately conductive with respect to the static charge releasing. In such a way, the connection resistance is perfect for the ESD protection, via an ESD bleed path consisted of read trace 221, conductive material 32, substrate section 251b, dissipative film 34, and substrate main body 251a of the substrate 251 that is grounded. Thus, static electricity generated on the read trace 221 will be discharged and released via this path to ground, so as to protect the read element connected from being damaged.

As a similar configuration, another ESD bleed path is configured in the negative read trace 221 (R−), and another via hole is positioned on the place near the distal end as indicated with B. The structure and composition is the same with that of the ESD bleed path mentioned above, and is not repeated here therefore.

Figure 7:
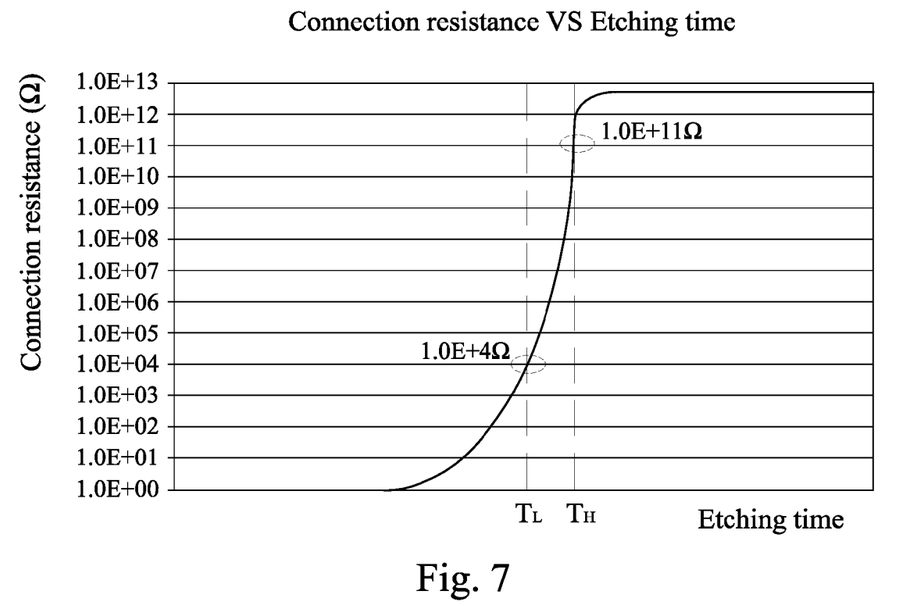
FIG. 7 shows the correlation between the connection resistance and the etching time.

FIG. 7 shows the correlation between the connection resistance of the dissipative film 34 and the etching time for creating the substrate section 251$b$. The etching time in creating the substrate section 251$b$ should be controlled in the time window between TL and TH to achieve the connection resistance from read wires 221 to the substrate main body 251$a$ in the range of 1.0E+4 to 1.0E+11 ohms.

Figure 8:
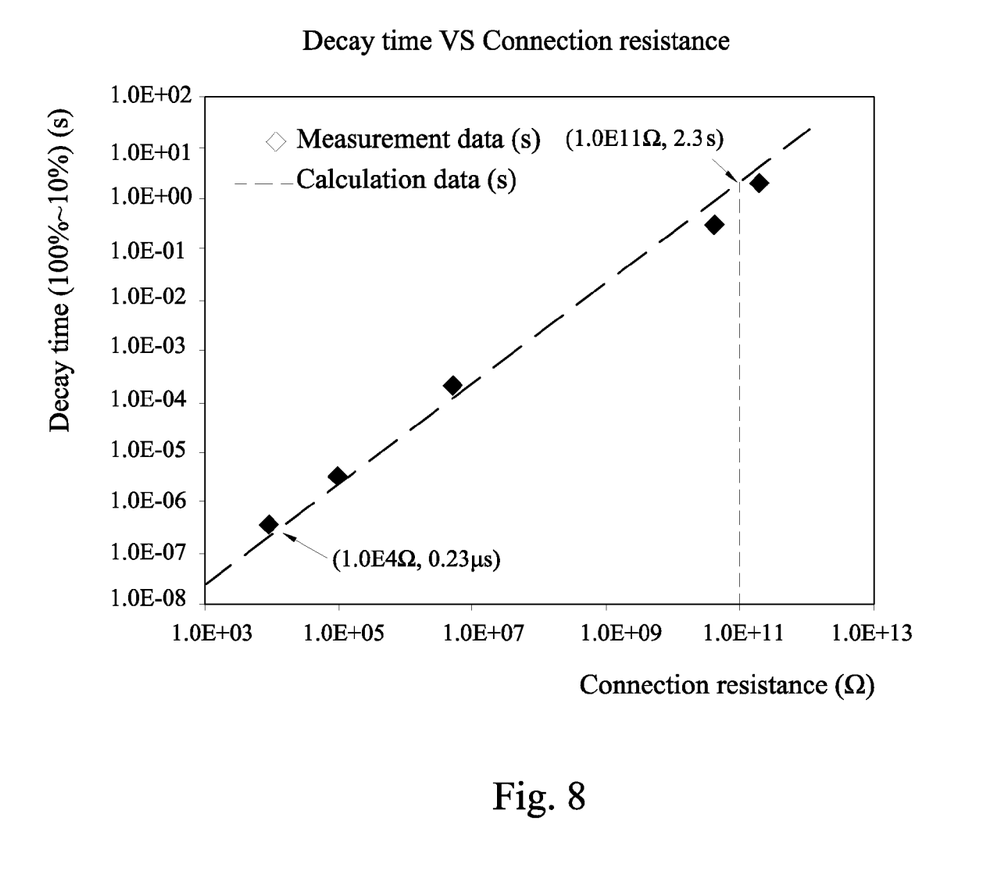
FIG. 8 shows the correlation between the connection resistance and the decay time of charge voltage in the read traces.
Figure 9A:
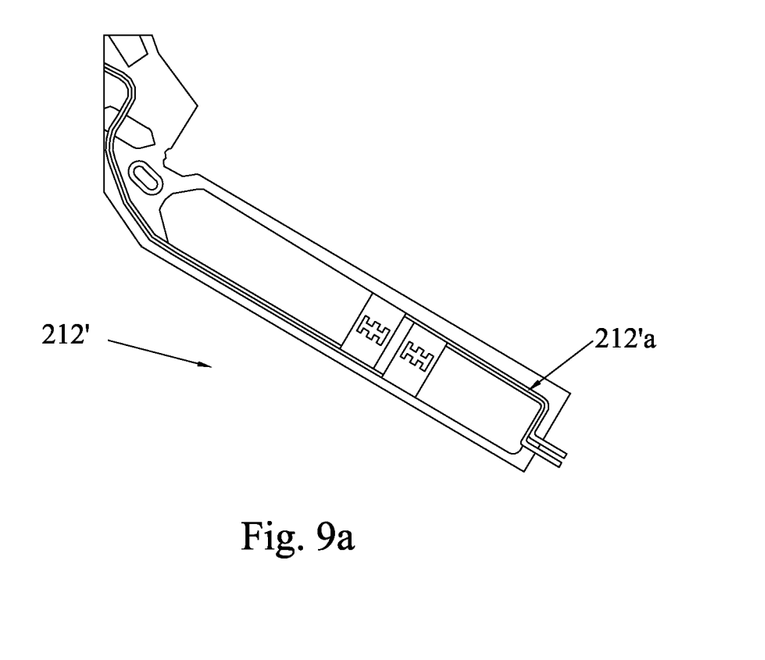
FIGS. 9a and 9b show suspension tails of the prior art and the present invention, and shows trace tails with stub and without stub respectively.
Figure 9B:
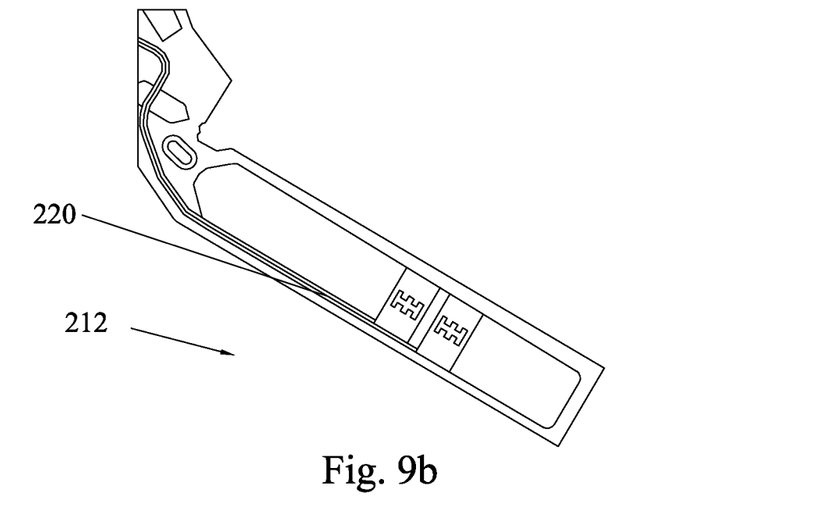
Figure 9C:
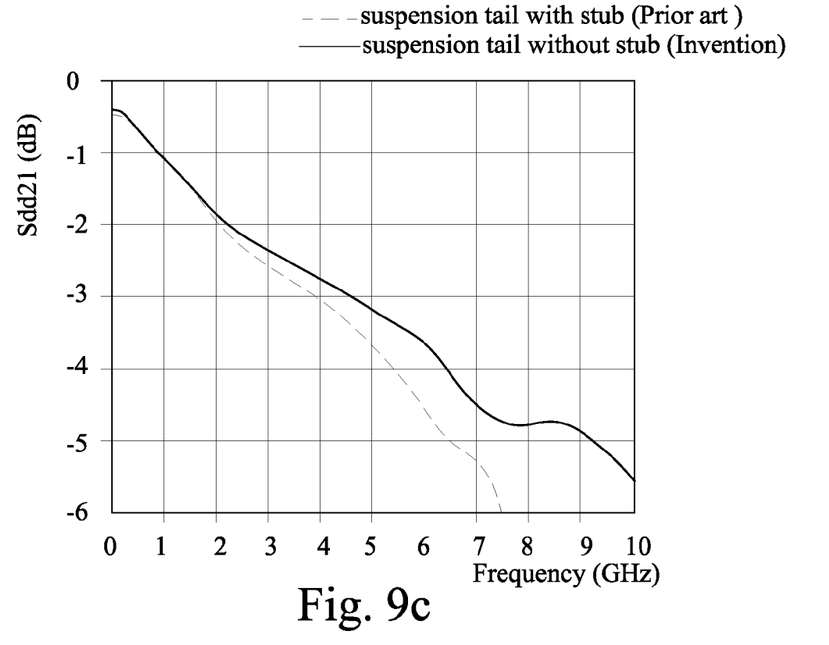
FIGS. 9c and 9d are electrical performance (bandwidth and impedance) comparisons between prior art and the present invention.
Figure 9D:
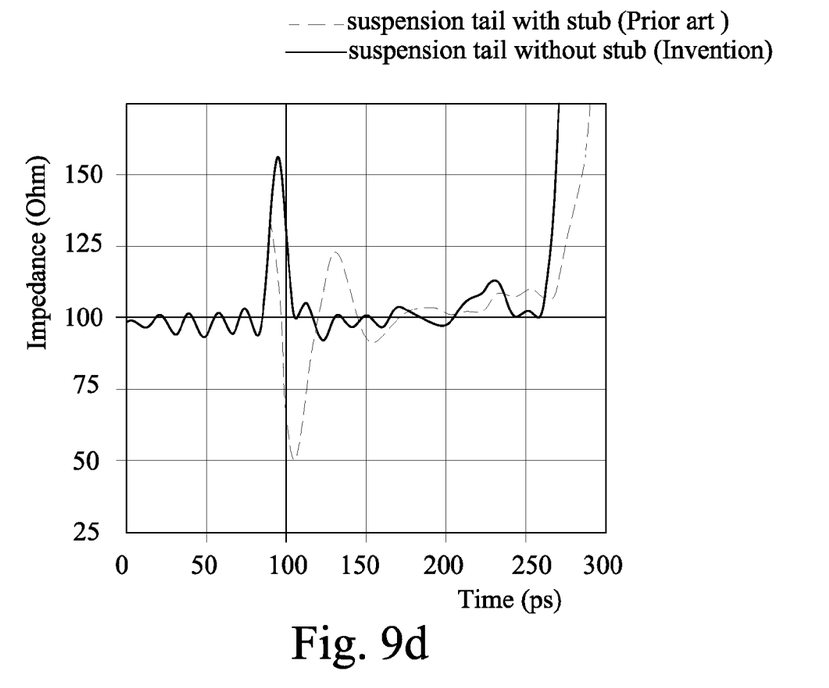

FIG. 8 shows the correlation between the connection resistance and the decay time of charge voltage in the read trace 221. From this figure, the decay time of charge voltage in the read trace 221 is controlled within 0.23 µs-2.3 s when the connection resistance is within 1.0E4-1.0E11 ohms.

In comparison with the prior art, since an ESD bleed path from the read trace 221 to the substrate 251 that is grounded is formed, and furthermore the substrate 251 is partially etched to control the connection resistance within 1.0E4-1.0E11 ohms which is suitable for both insulating the normal circuit operation and releasing the static charge in the read traces 221, thus the ESD damage to the read element is minimized or even eliminated. In this present invention, the via and stainless steel etching processes can be integrated to the existing processes of flexure manufacturing, no need additional process for lower manufacturing cost.

Moreover, as shown in FIG. 9$a$, different from the suspension tail 212' of the prior art that the trace stub 212'$a$ is formed as connection wire to plating electrical supply (not shown in FIG. 9$a$) in the electroplating process of widely used additive method for trace forming, as this invention includes via from trace to conductive substrate 251 (stainless steel layer), before the above mentioned conductive substrate section (or slots) are etched, conductive substrate layer 251 can be used as plating electrical supply layer in trace and via forming process. The conventional trace stub 212'$a$ at the end of the suspension tail 212 is no longer needed in electroplating process as shown in FIG. 9$b$; then electrical performance (like bandwidth and impedance continuity) can be improved due to the removal of stub. Specially, in the present invention, there is no any trace stubs at the distal end of the suspension tail 212, which may eliminate $\lambda/4$ resonance effect caused by the conventional stubs length, thereby improving electrical performance such as improved bandwidth and stable impedance of the suspension, as data shown in FIGS. 9$c$ and 9$d$.

Figure 10:
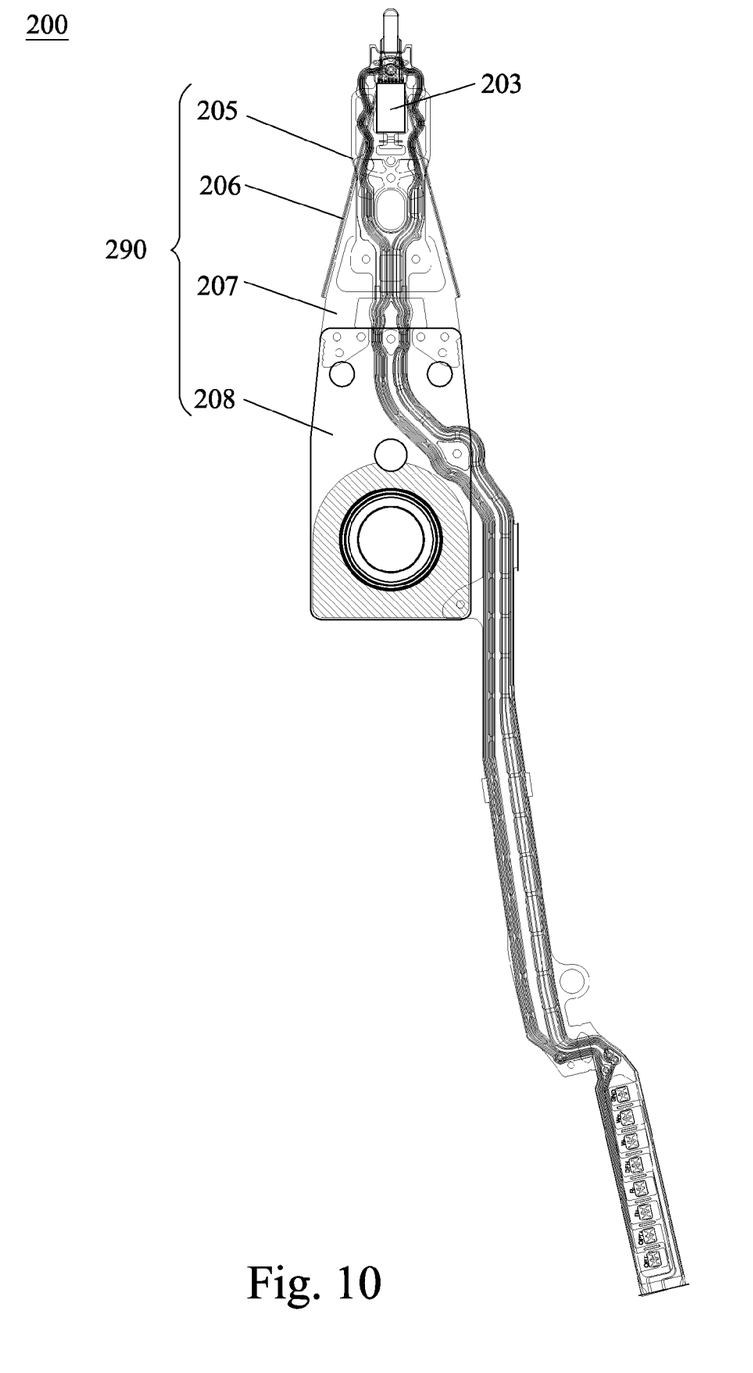
FIG. 10 is a perspective view of an HGA according to an embodiment of the present invention.

Now, referring to FIG. 10, a HGA 200 according to an embodiment of the invention includes the suspension 290 mentioned above and a slider 203 carried on the suspension 290. The suspension 290 includes a load beam 206, a base plate 208, a hinge 207 and the flexure 205, all of which are assembled with each other. The hinge 207 has a mounting hole 210 formed thereon to assemble the hinge 207 to the base plate 208. And then the slider 203 is carried on the flexure 205. It' known that the slider 203 has terminals that are connected to a write element and a read element (sensor), which are connected to the write and read terminals. The write element is, for example, a standard induction type magnetic transducer. The read element is an MR element, a GMR element, or a TMR element having a high read sensitivity.

Figure 11:
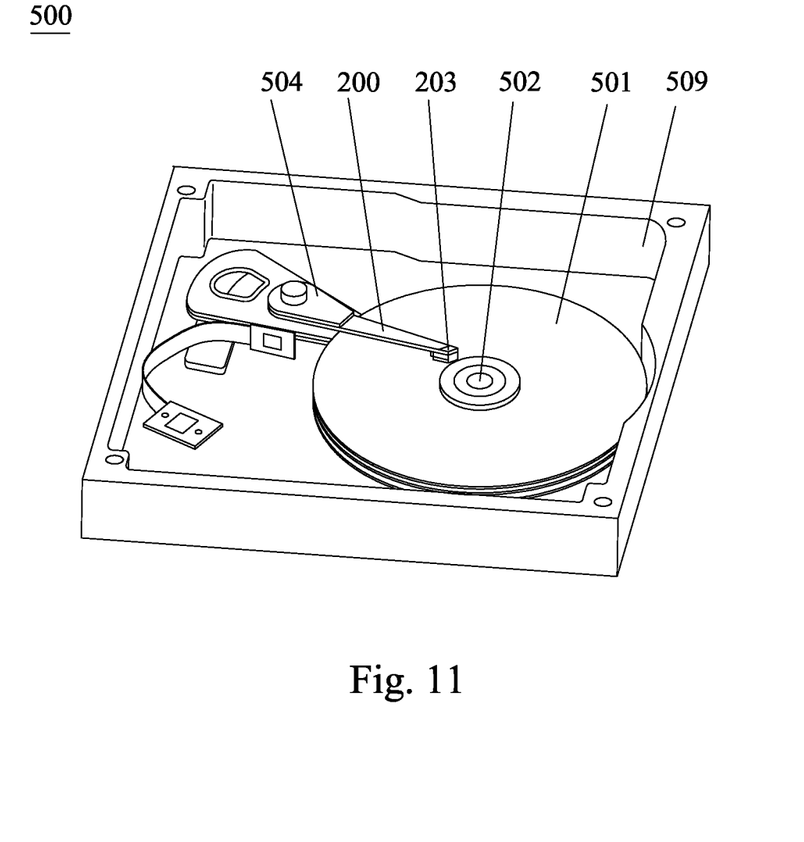
FIG. 11 is a perspective view of a disk drive unit according to an embodiment of the invention.

FIG. 11 is a disk drive unit according to an embodiment of the invention. The disk drive unit 500 comprises a HGA 200, a drive arm 504 connected to the HGA 200, a series of rotatable disks 501, and a spindle motor 502 to spin the disk 501, all of which are mounted in a housing 509. The HGA 200 includes a suspension 290 having a flexure 205 and a slider 203 as mentioned above. And the electrical traces 220 of the flexure 205 include read traces 221 with the ESD bleed path as well, so as to obtain the same advantages mentioned-above. Because the structure and/or assembly process of disk drive unit of the present invention are well known to persons ordinarily skilled in the art, a detailed description of such structure and assembly is omitted here.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A suspension for a head gimbal assembly, comprising:
   a flexure comprising a conductive substrate, and a dielectric layer formed on the conductive substrate, and the conductive substrate being grounded; and
   a plurality of electrical traces formed on the dielectric layer and extending from a leading portion to a trailing portion of the flexure, and the electrical traces at least comprising a pair of read traces;
   wherein at least one via is formed at certain position on the read traces to connect the read traces with the conductive substrate that is etched partially;
   wherein the conductive substrate comprises a substrate main body at least one substrate section, and at least one slot formed between the substrate main body and the substrate section, and the substrate section is located beneath the via and electronically connected with the read traces by conductive material in the via.

2. The suspension according to claim 1, wherein the substrate section is formed by etching the conductive substrate, until a dissipative film with predetermined resistance value that is remained in the slot after etching, to electrically connect the substrate section to the substrate main body within the predetermined resistance value.

3. The suspension according to claim 2, wherein the predetermined resistance value of the dissipative film is in a range from 1.0E+4 to 1.0E+11 ohms.

4. The suspension according to claim 1, further comprising an insulating cover layer that is covered on the electrical traces.

5. A head gimbal assembly, comprising:
   a slider;
   a suspension for supporting the slider, and the suspension comprising:
   a flexure comprising a conductive substrate, and a dielectric layer formed on the conductive substrate, and the conductive substrate being grounded; and
   a plurality of electrical traces formed on the dielectric layer and extending from a leading portion to a trailing portion of the flexure, and the electrical traces at least comprising a pair of read traces;
   wherein at least one via is formed at certain position on the read traces to connect the read traces with the conductive substrate that is etched partially;
   wherein the conductive substrate comprises a substrate main body, at least one substrate section, and at least one slot formed between the substrate main body and the substrate section, and the substrate section is located beneath the via and electrically connected with the read traces by conductive material in the via.

6. The head gimbal assembly according to claim 5, wherein the substrate section is formed by etching the conductive substrate, until a dissipative film with predetermined resistance value that is remained in the slot after etching, to electrically connect the substrate section to the substrate main body within the predetermined resistance value.

7. The head gimbal assembly according to claim 6, wherein the predetermined resistance value of the dissipative film is in a range from 1.0E4 to 1.0E11 ohms.

8. The head gimbal assembly according to claim 5, further comprising an insulating cover layer that is covered on the electrical traces.

9. A disk drive unit, comprising:
   a head gimbal assembly including a slider and a suspension that supports the slider;
   a drive arm connected to the head gimbal assembly;
   a series of disks; and
   a spindle motor operable to spin the disks;
   and the suspension comprising:
   a flexure comprising a conductive substrate, and a dielectric layer formed on the conductive substrate, and the conductive substrate being grounded; and
   a plurality of electrical traces formed on the dielectric layer and extending from a leading portion to a trailing portion of the flexure, and the electrical traces at least comprising a pair of read traces;
   wherein at least one via is formed at certain position on the read trace to connect the read traces with the conductive substrate that is etched partially;
   wherein the conductive substrate comprises a substrate main body, at least one substrate section, and at least one slot formed between the substrate main body and the substrate section, and the substrate section is located beneath the via and electrically connected with the read traces by conductive material in the via.

* * * * *